United States Patent
Pearce et al.

(10) Patent No.: US 9,669,705 B2
(45) Date of Patent: Jun. 6, 2017

(54) SYSTEMS AND METHODS FOR DETERMINING THE INTEGRITY OF A VEHICLE FUEL SYSTEM

(71) Applicant: Ford Global Technologies, LLC, Dearborn, MI (US)

(72) Inventors: Russell Randall Pearce, Ann Arbor, MI (US); Mark W. Peters, Wolverine Lake, MI (US); Aed M. Dudar, Canton, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 602 days.

(21) Appl. No.: 14/155,259

(22) Filed: Jan. 14, 2014

(65) Prior Publication Data

US 2015/0198123 A1 Jul. 16, 2015

(51) Int. Cl.
*F02D 41/22* (2006.01)
*B60K 15/035* (2006.01)
*F02M 25/08* (2006.01)

(52) U.S. Cl.
CPC ........ *B60K 15/03504* (2013.01); *F02D 41/22* (2013.01); *F02M 25/0809* (2013.01); *F02D 2041/225* (2013.01)

(58) Field of Classification Search
None
See application file for complete search history.

(56) References Cited

U.S. PATENT DOCUMENTS

| 4,671,071 A | 6/1987 | Sasaki |
| 6,276,344 B1 | 8/2001 | Isobe et al. |
| 6,722,187 B2 * | 4/2004 | Grieve ............... F02M 25/0809 73/114.38 |
| 7,320,314 B2 | 1/2008 | Kashima et al. |
| 8,074,627 B2 * | 12/2011 | Siddiqui ............ F02M 25/0818 123/516 |
| 8,327,691 B2 | 12/2012 | Drane et al. |

(Continued)

FOREIGN PATENT DOCUMENTS

JP 05180100 A * 7/1993

OTHER PUBLICATIONS

Frisk, E. et al., "Leakage Detection in a Fuel Evaporative System," Department of Electrical Engineering, Linköping University, SE-581 83, 6 pages.

(Continued)

*Primary Examiner* — Mahmoud Gimie
(74) *Attorney, Agent, or Firm* — James Dottavio; McCoy Russell LLP

(57) ABSTRACT

A method, comprising: indicating leakage on a canister side of a fuel system based on a first fuel system pressure following applying a vacuum to the fuel system with a fuel tank isolation valve closed; and indicating leakage on a fuel tank side of the fuel system based on the first fuel system pressure and a second fuel system pressure following applying a vacuum to the fuel system with the fuel tank isolation valve open. In this way, an ELCM with a single reference orifice may be used to perform a leak test with two different thresholds for leak detection. This may allow vehicles currently in production to meet future emissions standards without costly upgrades to the ELCM.

20 Claims, 7 Drawing Sheets

(56) References Cited

U.S. PATENT DOCUMENTS

| | | | |
|---|---|---|---|
| 8,342,157 B2 | 1/2013 | Der Manuelian et al. | |
| 8,353,273 B2 | 1/2013 | Mc Lain et al. | |
| 8,551,214 B2 | 10/2013 | Dudar et al. | |
| 8,560,167 B2* | 10/2013 | Jentz | G01M 3/025 180/441 |
| 2006/0059979 A1* | 3/2006 | Matsubara | F02M 25/089 73/114.39 |
| 2011/0079201 A1* | 4/2011 | Peters | F02M 25/0818 123/520 |
| 2013/0096757 A1* | 4/2013 | Fukui | F02M 25/0809 701/22 |
| 2013/0112176 A1* | 5/2013 | Peters | F02M 25/0809 123/521 |
| 2013/0247880 A1* | 9/2013 | Plymale | F02M 25/0836 123/519 |
| 2015/0198123 A1* | 7/2015 | Pearce | B60K 15/03504 123/520 |

OTHER PUBLICATIONS

Kobayashi, M. et al., "Evaporative Leak Check System by Depressurization Method," SAE Technical Paper Series 2004-01-0143, SAE 2004 World Congress, Detroit, MI, Mar. 8-11, 2004, 9 pages.

Dudar, Aed M. et al., "Supercharged Internal Combustion Engine with Twin-Flow Turbine and Method for Operating an Internal Combustion Engine of Said Type," U.S. Appl. No. 14/155,254, filed Jan. 14, 2014, 34 pages.

Pearce, Russell R. et al., "Method and System for Fuel Vapor Control," U.S. Appl. No. 14/034,424, filed Sep. 23, 2013, 38 pages.

Anonymous, "Method to Minimize Hydrocarbon Emissions in a PHEV Vehicle," IPCOM No. 000229408, Published Jul. 26, 2013, 2 pages.

Anonymous, "Energy Efficient ELCM Evap Monitor for PHEV Vehicles," IPCOM No. 000233164, Published Nov. 27, 2013, 2 pages.

Anonymous, "A Method to Reduce Evap Bleed Emissions in HEV Vehicles," IPCOM No. 000237774, Published Jul. 10, 2014, 2 pages.

Anonymous, "Method to reduce fuel volatility in PHEV vehicles to improve Evap monitor robustness and emissions," IPCOM No. 000238130D, Published Aug. 4, 2014, 2 pages.

Anonymous, "A Carbon Canister Integrity Diagnostic for HEV Using ELCM Pump," IPCOM No. 000238913, Published Sep. 24, 2014, 2 pages.

Anonymous, "A Carbon Canister Integrity Diagnostic for PHEV Using Diurnal Temperature Cycle," IPCOM No. 000240457, Published Jan. 30, 2015, 2 pages.

Anonymous, "A Method to Eliminate Passive Valves in Nircos Sealed Tanks," IPCOM No. 000240487, Published Feb. 3, 2015, 2 pages.

Anonymous, "An Onboard Method to Mitigate Very Small Evap Leaks in Start/Stop and HEV Vehicles," IPCOM No. 000240776, Published Feb. 27, 2015, 2 pages.

Anonymous, "A Method to Perform Offboard Purging for PHEV Vehicles," IPCOM No. 000241418, Published Apr. 24, 2015, 2 pages.

* cited by examiner

SYSTEMS AND METHODS FOR DETERMINING THE INTEGRITY OF A VEHICLE FUEL SYSTEM

BACKGROUND AND SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere. In a typical leak test, a vacuum is applied to the fuel system. The integrity of the system is determined by monitoring the decay of the applied vacuum or by comparing the resulting fuel system pressure to an expected pressure. The vacuum source may be the intake manifold of the vehicle engine. In some vehicles, such as hybrid electric vehicles, the vehicle engine may not run frequently, or may not generate enough vacuum to conduct a leak test. Such vehicles are required to have an evaporative leak check module (ELCM) coupled to the fuel system. The ELCM includes a vacuum pump that can be coupled to the fuel system for leak testing.

A typical ELCM also contains a reference orifice. As a reference check, the ELCM may be isolated from the fuel system, and the vacuum pump activated to draw a vacuum on the reference orifice. The resulting pressure serves as a reference for leaks of equivalent size. However, this limits the ELCM to detecting leaks larger than the reference orifice. As emissions regulations evolve, leak detection standards are increasing. Vehicles built with ELCM reference orifices of 0.02" are inadequate for determining leaks of 0.01" in this way. It would require costly service to replace the ELCM in these vehicles.

Further, by drawing a vacuum on the fuel tank with the ELCM, fuel vapor is removed to the fuel vapor canister. However, the vehicles most likely to comprise an ELCM (HEVs, PHEVs, low intake vacuum vehicles) are likely to have limited opportunities to purge the canister. In order to remove the stored vapor, the engine may have to be forced on, decreasing the vehicle efficiency. If the ELCM test is performed after a vehicle-off condition, the vapor canister could remain full over a long period of time, leaving the canister susceptible to bleed emissions.

The inventors herein have recognized the above issues and have developed systems and methods to at least partially address them. In one example, a method, comprising: indicating leakage on a canister side of a fuel system based on a first fuel system pressure following applying a vacuum to the fuel system with a fuel tank isolation valve closed; and indicating leakage on a fuel tank side of the fuel system based on the first fuel system pressure and a second fuel system pressure following applying a vacuum to the fuel system with the fuel tank isolation valve open. In this way, an ELCM with a single reference orifice may be used to perform a leak test with two different thresholds for leak detection. This may allow vehicles currently in production to meet future emissions standards without costly upgrades to the ELCM.

In another example, a method for an evaporative emissions system leak test, comprising: determining a reference vacuum threshold; determining a first fuel system pressure by drawing a vacuum on a fuel system with a fuel tank isolation valve closed; generating a canister threshold value based on the first fuel system pressure and the reference vacuum threshold; indicating a leak based on the canister threshold value; determining a second fuel system pressure by drawing a vacuum on the fuel system with the fuel tank isolation valve open; generating a fuel system threshold value based on the second fuel system pressure and the reference vacuum threshold; and indicating a leak based on the fuel system threshold value and the canister threshold value. In this way, a vehicle may utilize an ELCM to detect leaks in a fuel tank that are smaller than the reference orifice within the ELCM. This may allow ELCMs currently in production to be utilized to meet future emissions standards without increasing the production costs by adding additional orifices and associated valves and conduits.

In yet another example, a fuel system for a vehicle, comprising: a fuel tank; a fuel vapor canister coupled to the fuel tank via a fuel tank isolation valve; an evaporative leak check module coupled to the fuel vapor canister via a canister vent valve; and a control system including executable instructions stored in non-transitory memory for: determining a reference vacuum threshold; determining a first fuel system pressure by drawing a vacuum on the fuel system with the fuel tank isolation valve closed; generating a canister threshold value based on the first fuel system pressure and the reference vacuum threshold; indicating a leak based on the canister threshold value; determining a second fuel system pressure by drawing a vacuum on the fuel system with the fuel tank isolation valve open; generating a fuel system threshold value based on the second fuel system pressure and the reference vacuum threshold; and indicating a leak based on the fuel system threshold value and the canister threshold value. In this way, the ELCM may draw a vacuum on the fuel tank, which may then be utilized to desorb stored fuel vapor from the fuel vapor canister back to the fuel tank. This may decrease bleed emissions in a passive manner, without drawing power on the vehicle battery, and without forcing the vehicle engine on to perform a purge routine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 1:
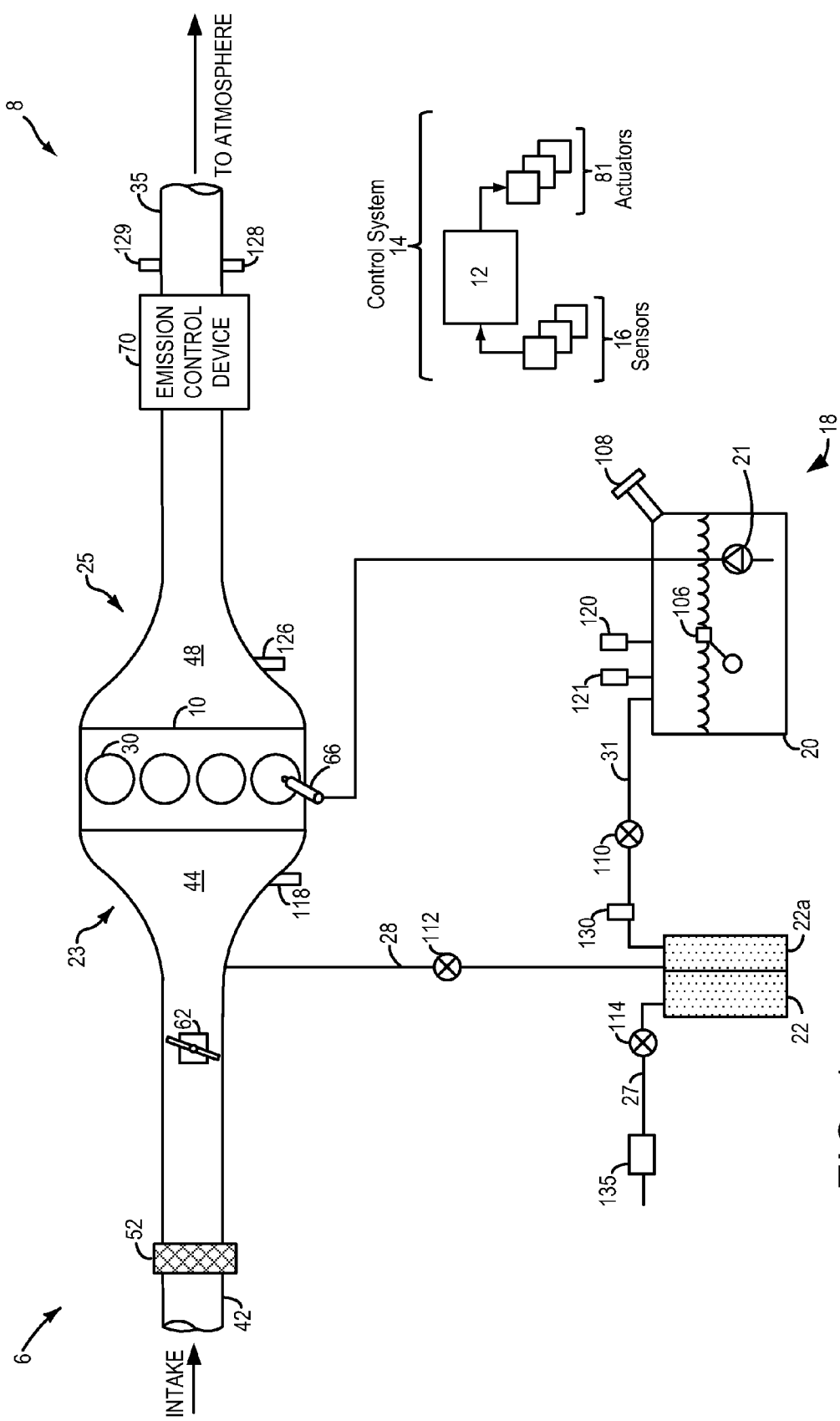
FIG. 1 shows a schematic depiction of a fuel system coupled to an engine system.
Figure 4:
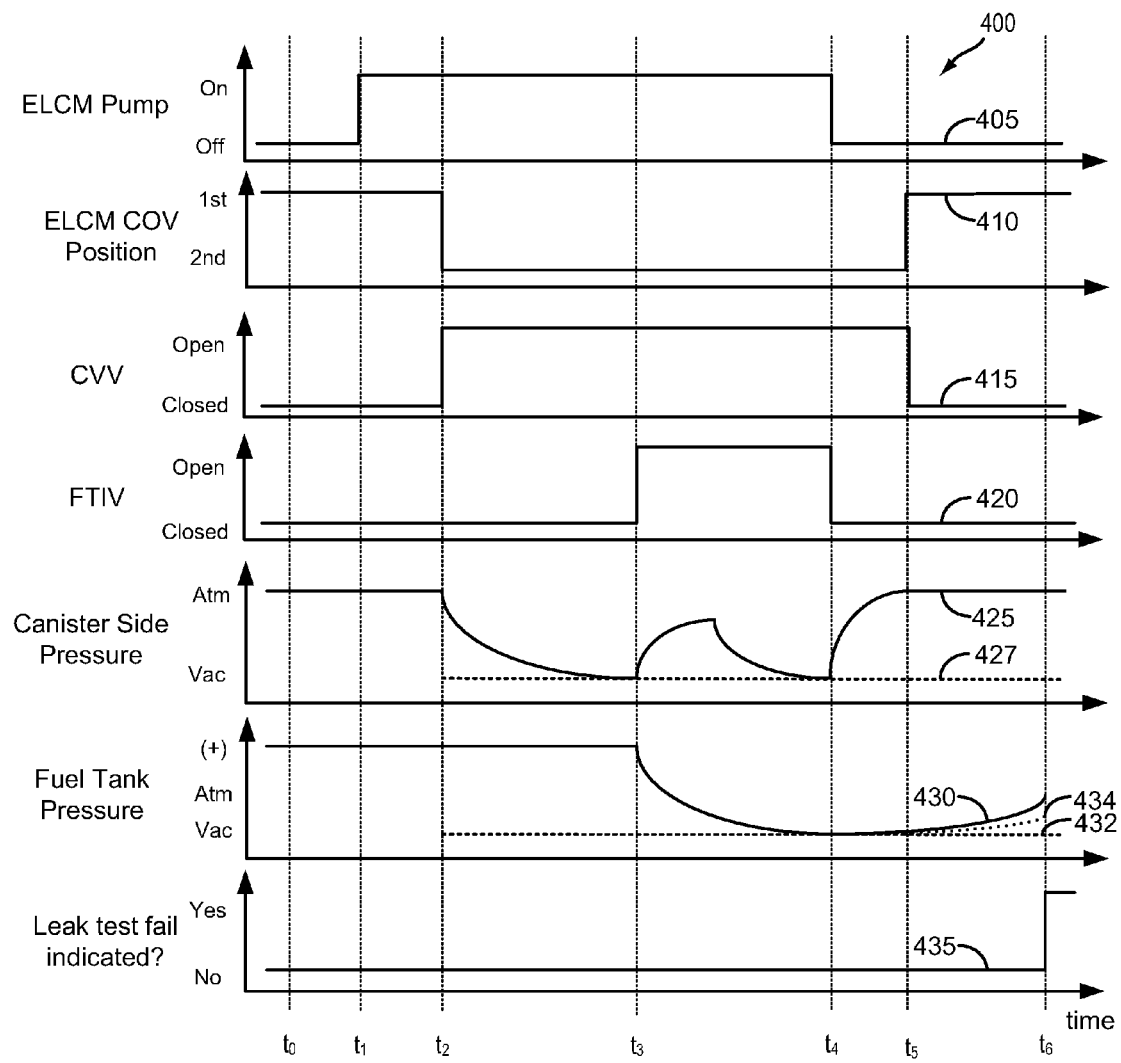
FIG. 4 shows a timeline for an example evaporative leak check module test using the method shown in FIG. 3.
Figure 5:
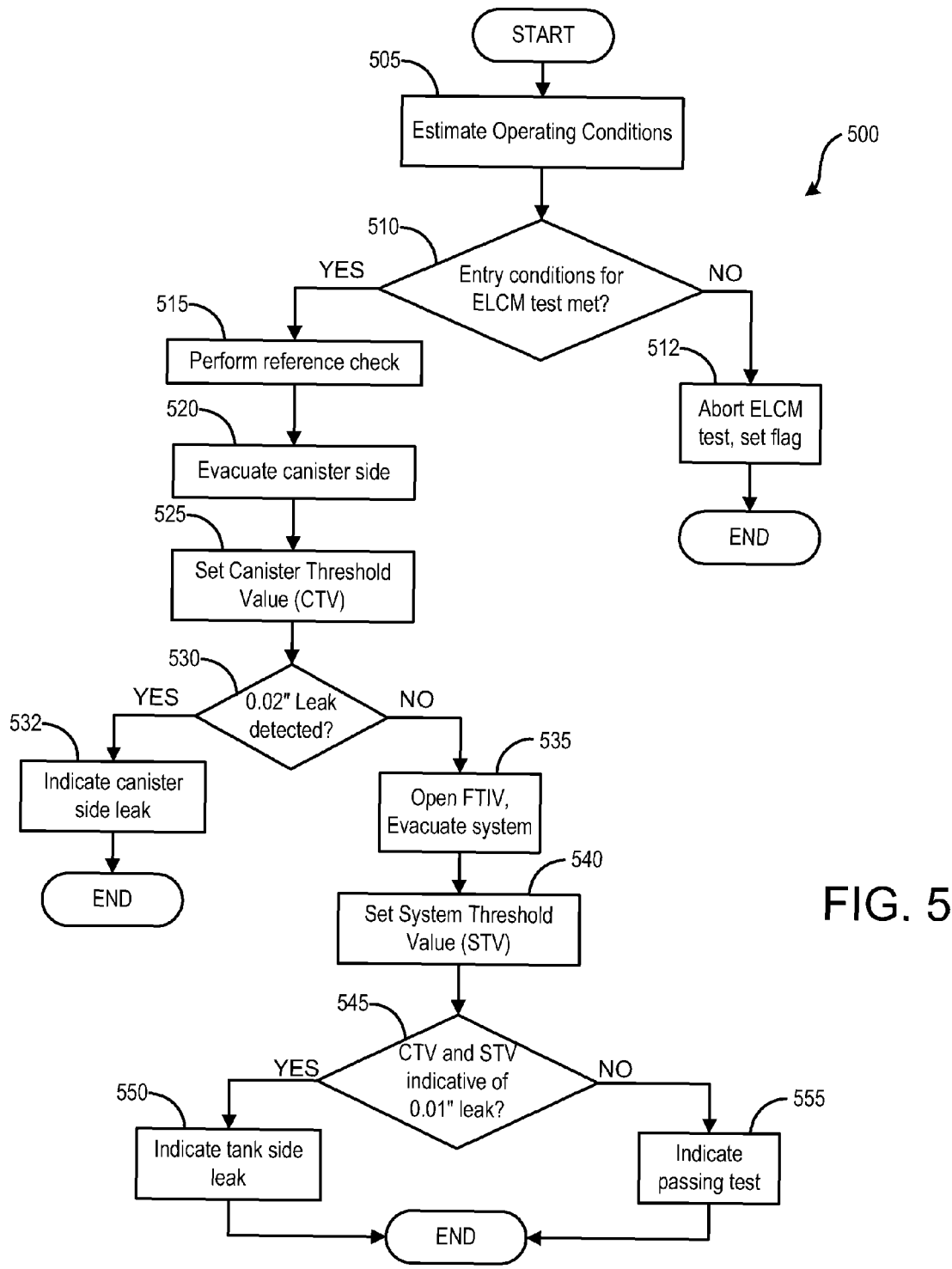
FIG. 5 shows a high level flow chart for a method that may be implemented for performing an evaporative leak check module test.
Figure 6:
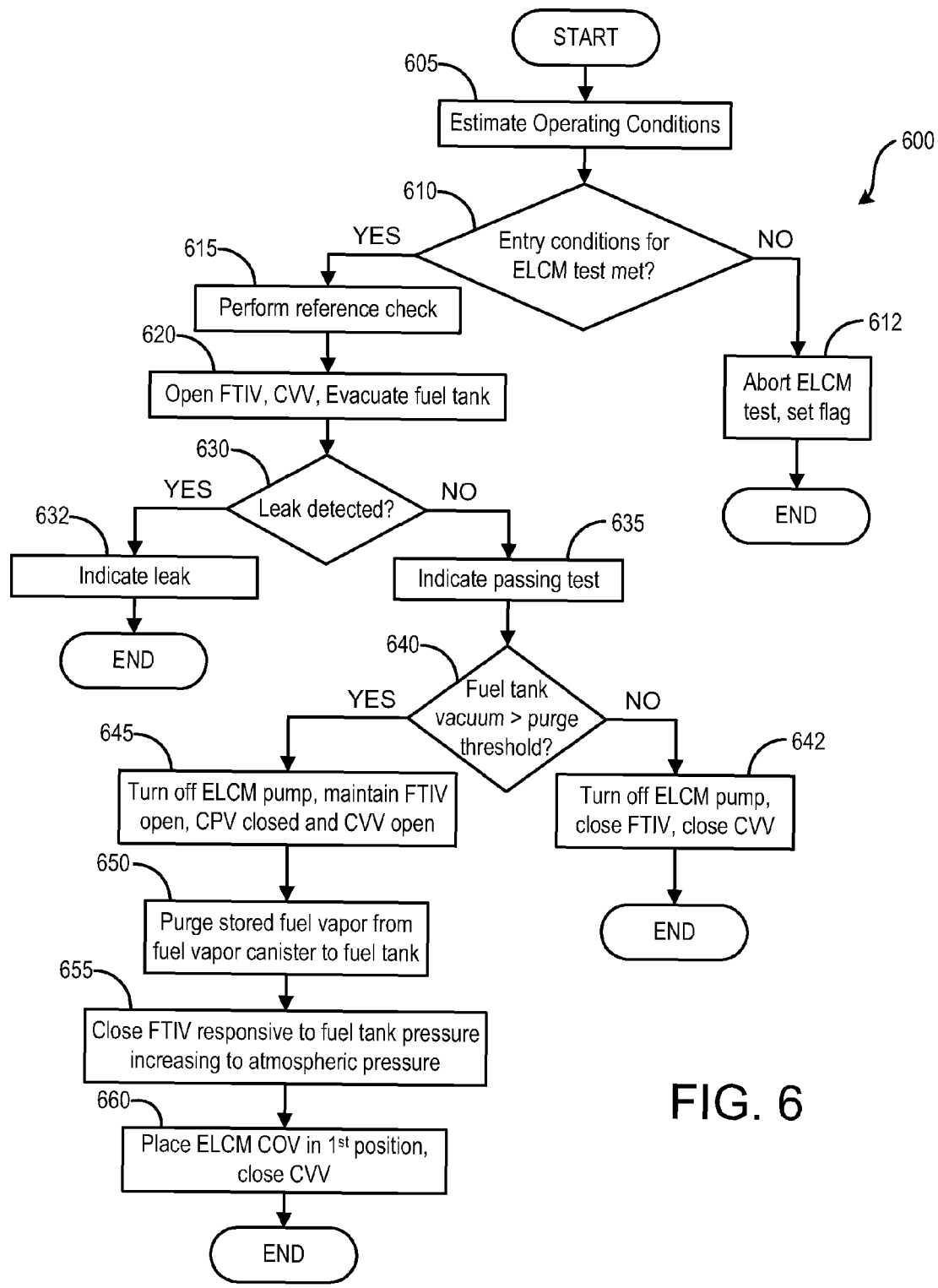
FIG. 6 shows a high level flow chart for a method that may be implemented for performing an evaporative leak check module test followed by a passive fuel vapor canister routine.
Figure 7:
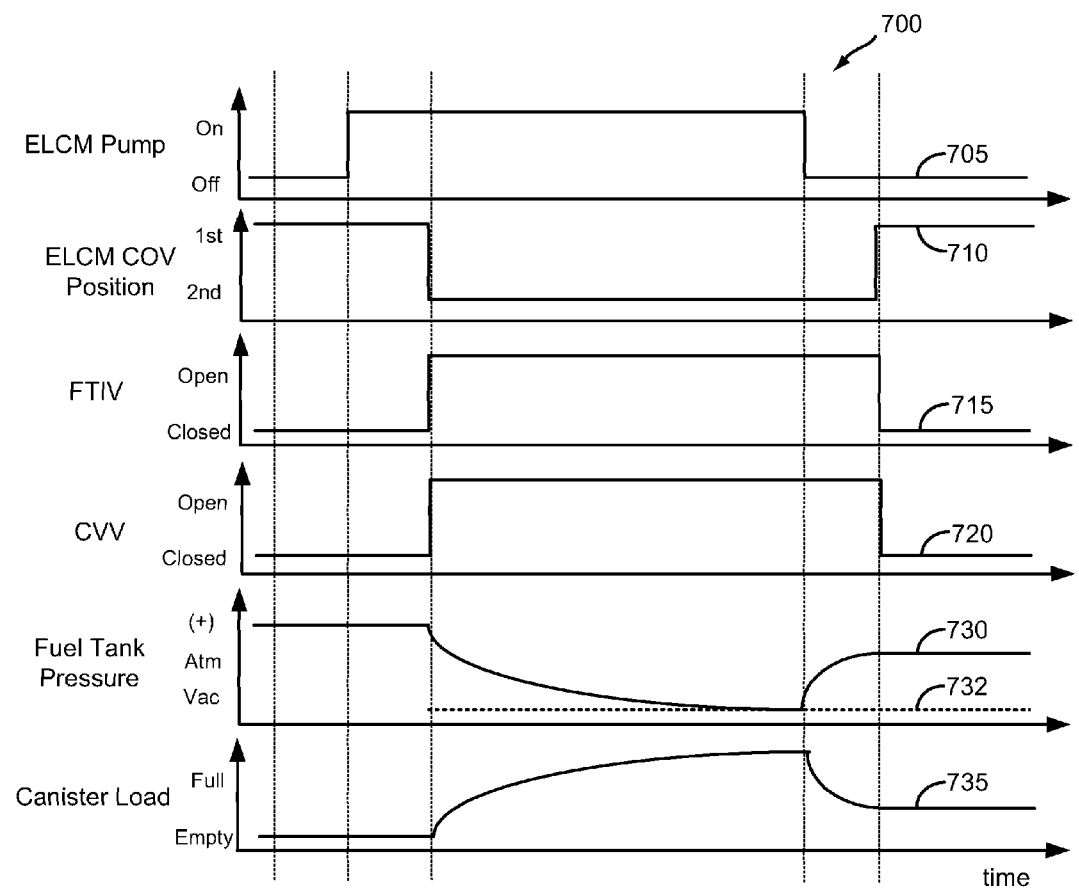
FIG. 7 shows a timeline for an example evaporative leak check module test followed by a passive fuel vapor canister purge routine using the method shown in FIG. 6.

This description relates to systems and methods for leak testing a fuel system coupled to an engine, such as the fuel system and engine system depicted in FIG. 1. The fuel system and engine system may be included in a hybrid vehicle, and may necessitate the inclusion of an evaporative leak check module (ELCM). An ELCM may be configured to adapt conformations, such as the conformations shown in FIGS. 2A-2C. A controller or power train control module (PCM) may be configured to perform a control routine for an ELCM test, such as the method depicted in FIG. 3. The method may include determining the integrity of the canister side of the fuel system first, followed by determining the integrity of the fuel tank by drawing a vacuum on the fuel tank, sealing the fuel tank, then monitoring the subsequent vacuum bleed-up. FIG. 4 shows an example ELCM test using the method of FIG. 3. FIG. 5 shows an alternative method for determining the integrity of the canister side of the fuel system, followed by determining the integrity of the fuel tank by drawing a vacuum on the fuel tank. In this way, leaks smaller than an ELCM reference orifice may be detected. FIG. 6 shows a method for an ELCM test followed by a passive purge routine that allows fuel vapor to be desorbed from the fuel vapor canister to the fuel tank. FIG. 7 shows an example ELCM test followed by a passive purge routine using the method of FIG. 3.

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid. In some examples, an air filter may be coupled in vent 27 between canister vent valve 114 and atmosphere.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. Hydrocarbon sensor 130 is shown coupled to conduit 31 between isolation valve 110 and canister 22. In other embodiments, hydrocarbon sensor 130 may be coupled directly to or within canister 22. Additionally or alternatively, one or more oxygen sensors (not shown) may be coupled to the canister 22 (e.g., downstream of the canister), or positioned in the engine intake and/or engine exhaust. One or both of hydrocarbon sensor 130 and the one or more oxygen sensors may be configured to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIGS. 3, 5, and 6.

Leak detection routines may be intermittently performed by controller 12 on fuel system 18 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 135 communicatively coupled to controller 12. ELCM 135 may be coupled in vent 27, between canister 22 and the atmosphere. ELCM 135 may include a vacuum pump for applying negative pressure to the fuel system when administering a leak test. ELCM 135 may further include a reference orifice and a pressure sensor. One embodiment of ELCM 135 is discussed in detail further herein and with regards to FIGS. 2A-2C. Following the applying of vacuum to the fuel system, a change in pressure at the reference orifice (e.g., an absolute change or a rate of change) may be monitored and compared to a threshold. Based on the comparison, a fuel system leak may be diagnosed.

Figure 2A:
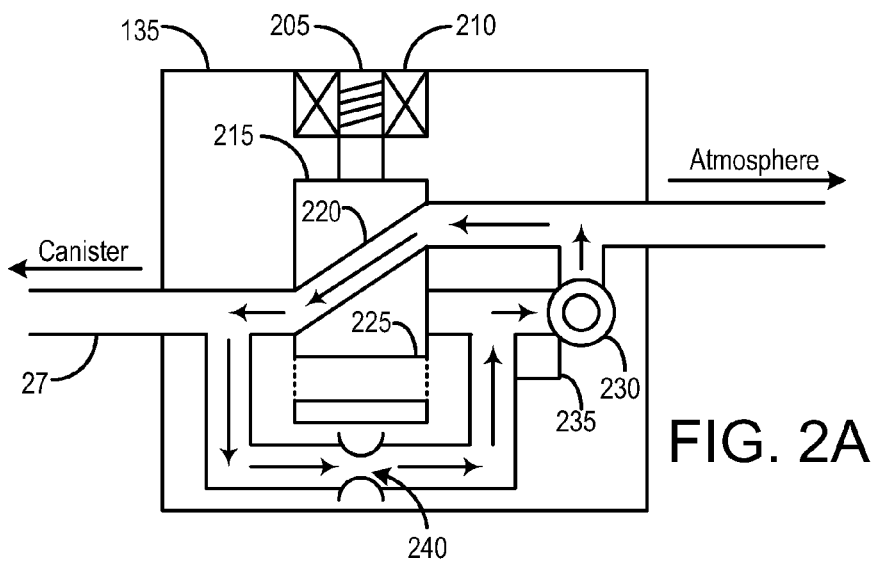
FIG. 2A shows a schematic depiction of an evaporative leak check module in a configuration to perform a reference check.
Figure 2B:
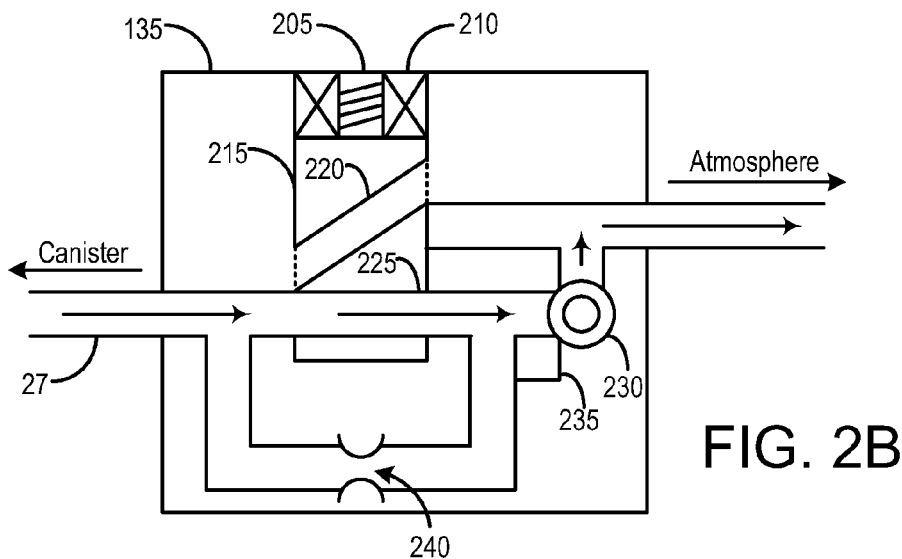
FIG. 2B shows a schematic depiction of an evaporative leak check module in a configuration to perform a tank evacuation leak check.
Figure 2C:
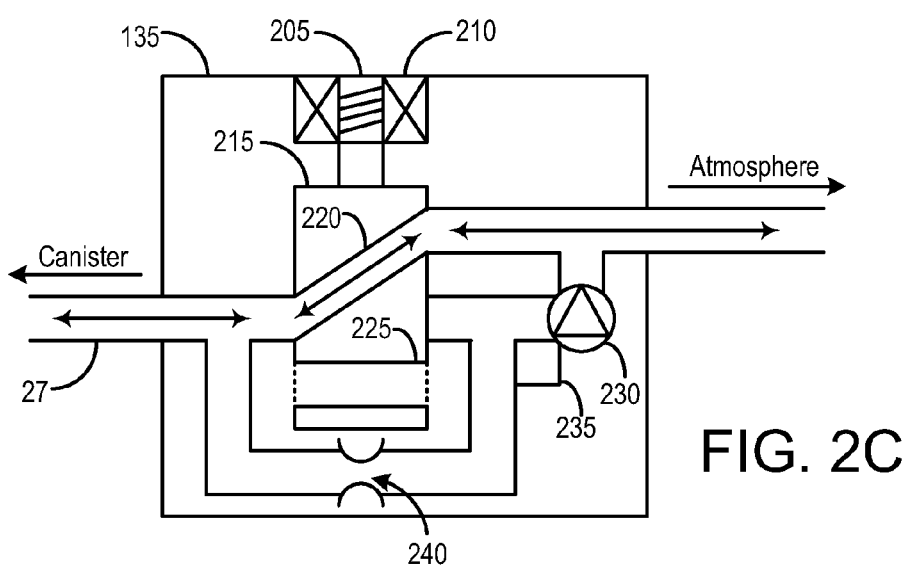
FIG. 2C shows a schematic depiction of an evaporative leak check module in a configuration to perform a purge operation.

FIGS. 2A-2C show a schematic depiction of an example ELCM 135 in various conditions in accordance with the present disclosure. As shown in FIG. 1, ELCM 135 may be located along vent 27 between canister vent valve 114 and atmosphere. ELCM 135 includes a changeover valve (COV) 215, a pump 230, and a pressure sensor 235. Pump 230 may be a vane pump. COV 215 may be moveable between a first a second position. In the first position, as shown in FIGS. 2A and 2C, air may flow through ELCM 135 via first flow path 220. In the second position, as shown in FIG. 2B, air may flow through ELCM 135 via second flow path 225. The position of COV 215 may be controlled by solenoid 210 via compression spring 205. ELCM may also comprise reference orifice 240. Reference orifice 240 may have a diameter corresponding to the size of a threshold leak to be tested, for example, 0.02". In either the first or second position, pressure sensor 235 may generate a pressure signal reflecting the pressure within ELCM 135. Operation of valve 230 and solenoid 210 may be controlled via signals received from controller 12.

As shown in FIG. 2A, COV 215 is in the first position, and pump 230 is activated. Canister vent valve 114 (not shown) is closed, isolating ELCM 135 from the canister and fuel tank. Air flow through ELCM 135 in this configuration is represented by arrows. In this configuration, pump 230 may draw a vacuum on reference orifice 240, and pressure sensor 235 may record the vacuum level within ELCM 135. This reference check vacuum level reading may then become the threshold for passing/failing a subsequent leak test.

As shown in FIG. 2B, COV 215 is in the second position, and pump 230 is activated. Canister vent valve 114 (not shown) is open, allowing pump 230 to draw a vacuum on fuel system 18. In examples where fuel system 18 includes FTIV 110, FTIV 110 may be opened to allow pump 230 to draw a vacuum on fuel tank 20. Air flow through ELCM 135 in this configuration is represented by arrows. In this configuration, as pump 230 pulls a vacuum on fuel system 18, the absence of a leak in the system should allow for the vacuum level in ELCM 135 to reach or exceed the previously determined vacuum threshold. In the presence of a leak larger than the reference orifice, the pump will not pull down to the reference check vacuum level.

As shown in FIG. 2C, COV 215 is in the first position, and pump 230 is de-activated. Canister vent valve 114 is open, allowing for air to freely flow between atmosphere and the canister. This configuration may be used during a canister purging operation, for example.

The inclusion of reference orifice 240 allows the ELCM to internally correct for a number of factors, including air temperature, humidity, air density, etc. However, newer regulations may require testing different compartments of the evaporative emissions system for different sized leaks. In one example, future regulations for PHEVs require testing the tank side of the evaporative emissions system for 0.01" leaks, while the rest of the system (e.g. the canister side) needs to be checked for 0.02" leaks. Most current ELCMs do not include a 0.01" reference orifice. Adding an additional reference orifice and associated valves would add manufacturing cost and system complexity. The inventors herein have developed methods for detecting leaks of multiple sizes using an ELCM with a single reference orifice, the reference orifice having a larger diameter than the smallest detectable leak.

Figure 3:
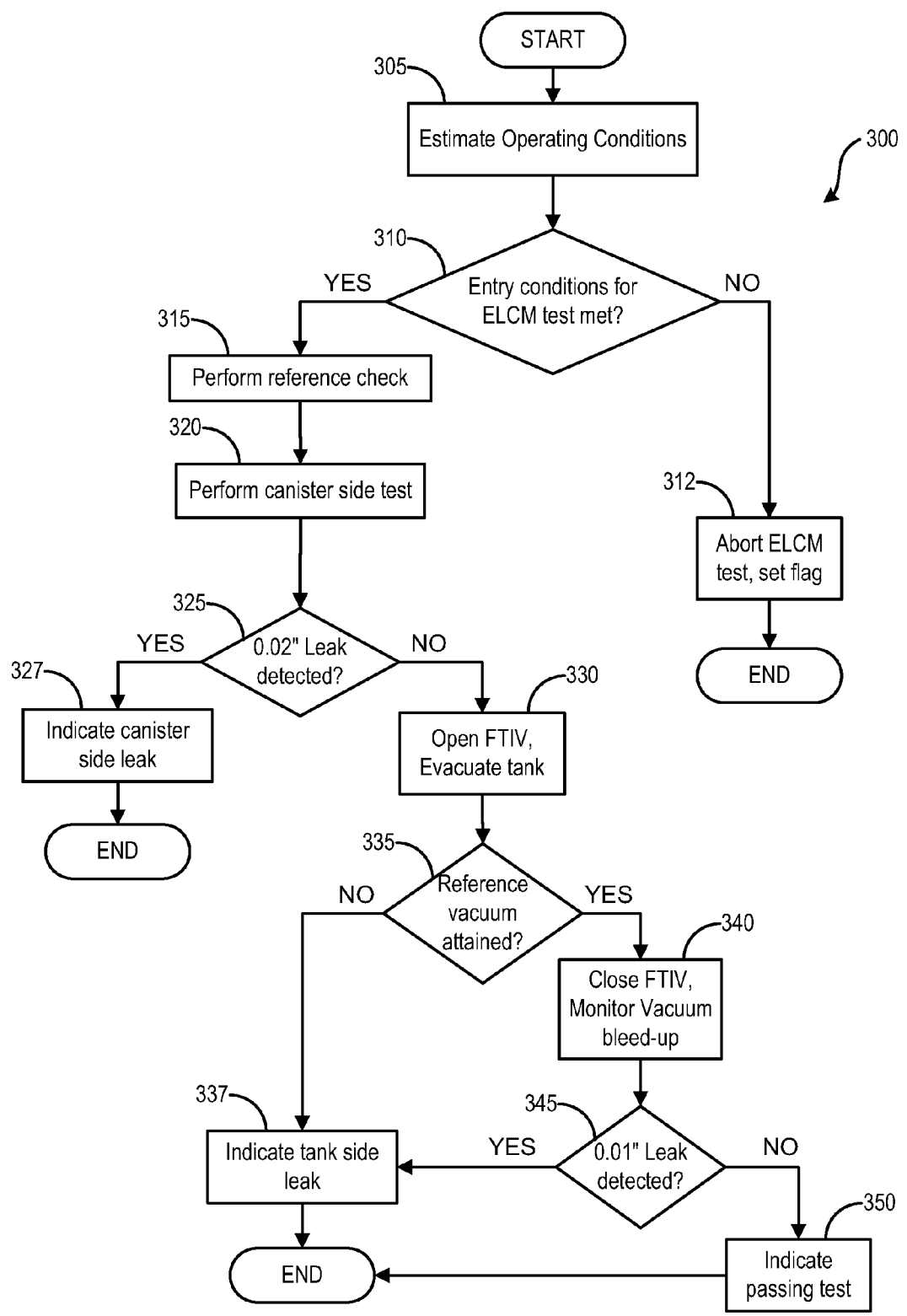
FIG. 3 shows a high level flow chart for a method that may be implemented for performing an evaporative leak check module test.

FIG. 3 shows one such example. FIG. 3 shows a high-level flow chart for an example method 300 for performing an ELCM test in accordance with the current disclosure. Method 300 will be described with relation to the systems depicted in FIGS. 1 and 2, but it should be understood that similar methods may be used with other systems without departing from the scope of this disclosure. Method 300 may be carried out by controller 12.

Method 300 may begin at 305 by estimating operating conditions. Operating conditions may include ambient conditions, such as temperature, humidity, and barometric pressure, as well as vehicle conditions, such as engine operating status, fuel level. Continuing at 310, method 300 may include determining whether the entry conditions for an ELCM test are met. Entry conditions for an ELCM test may include an engine-off status, and/or determining that the fuel system is not undergoing a purge operation. If entry conditions are not met, method 300 may proceed to 312. At 312, method 300 may include recording that an ELCM test was aborted, and may further include setting a flag to retry the ELCM test at a later time point.

If entry conditions for an ELCM test are met, method 300 may proceed to 315. At 315, method 300 may include performing an ELCM reference check. As discussed herein with regards to FIG. 2A, an ELCM reference check may comprise closing (or maintaining closed) a canister vent valve, placing a COV in a first position, and activating an ELCM vacuum pump. A pressure sensor, such as pressure sensor 235 may record the resulting vacuum level in the ELCM, after a certain amount of time, or when the vacuum level has reached a plateau. The recorded vacuum level at the end of the reference check may be used as a vacuum threshold to signify the expected vacuum attainable for a systemic leak with a diameter equivalent to the reference orifice. In this example embodiment, the reference orifice has a diameter of 0.02", but may be smaller or greater in diameter in other embodiments.

Continuing at 320, method 300 may include performing a canister side test. The canister side test may comprise closing (or maintaining closed) a fuel tank isolation valve, closing (or maintaining closed) a canister purge valve, opening a canister vent valve, placing COV 215 in the second position and activating pump 230. In this configuration, as pump 230 pulls a vacuum on the canister side of fuel system 18, the absence of a leak in the system should allow for the vacuum level in ELCM 135 to reach or exceed the previously determined vacuum threshold. In the presence of a leak larger than the reference orifice, the pump will not pull down to the reference check vacuum level. The pull down may be executed until the reference vacuum is met, for a time period that is predetermined, or for a time period based on current conditions. Following the canister side test, method 300 may include de-activating pump 230, de-energizing solenoid 210, and may further include closing the vent valve.

Continuing at 325, method 300 may include determining whether the test vacuum acquired during the ELCM test is greater than or equal to the vacuum threshold for a 0.02" leak. If a leak is detected (e.g. the test vacuum does not reach the vacuum threshold during the allotted time period), method 300 may proceed to 327. At 327, method 300 may include indicating a canister side leak. Indicating a canister side leak may include recording the occurrence of a failing test result, and may further include illuminating an MIL. Method 300 may then end.

If no leak greater than or equal to 0.02" is detected on the canister side, method 300 may proceed to 330. At 330, method 300 may include opening the FTIV and evacuating the fuel tank. Method 300 may include activating (or maintaining active) pump 230, energizing solenoid 210 (or otherwise placing or maintaining the COV in the second position), and opening or maintaining open the vent valve. In this configuration, both the fuel tank and the canister side of the fuel system are fluidly coupled to the ELCM pump. Evacuating the fuel tank thus includes evacuating the entire fuel system. The fuel tank evacuation may be executed until the reference vacuum is met, for a time period that is predetermined, or for a time period based on current conditions.

Continuing at 335, method 300 may include determining whether the reference vacuum was attained during the fuel tank evacuation period. If the reference vacuum was not attained, method 300 may proceed to 337. At 337, method 300 may include indicating a tank side leak. Indicating a tank side leak may include recording the occurrence of a failing test result, and may further include illuminating an MIL. Method 300 may then end.

If the reference vacuum is attained during the fuel tank evacuation period, method 300 may proceed to 340. At 340, method 300 may include closing the FTIV and monitoring the subsequent vacuum bleed-up. Following the fuel tank evacuation, method 300 may also include de-activating pump 230, de-energizing solenoid 210, and may further include closing the vent valve. By closing the FTIV in this manner, the vacuum drawn on the fuel tank is trapped within the tank. Monitoring the vacuum bleed-up may include monitoring the pressure within the fuel tank with one or more pressure sensors, such as pressure sensor 120, as shown in FIG. 1. Monitoring the vacuum bleed-up may further include comparing the rate of vacuum bleed-up with an expected rate of vacuum bleed-up for a fuel tank with a 0.01" leak. The expected rate of vacuum bleed-up may be pre-determined, or may be based on current conditions, such as fuel tank fill level and ambient temperature.

Continuing at 345, method 300 may include determining whether a 0.01" leak is detected. Detection of a 0.01" leak may be indicated if the vacuum bleed-up rate is greater than the expected vacuum bleed-up rate. If a 0.01" leak is detected, method 300 may proceed to 337, indicating a tank side leak. Method 300 may then end. If no 0.01" leak is detected, method 300 may proceed to 350. At 350, method 300 may include indicating a passing test. Indicating a passing test may include recording the occurrence of a passing test result. Method 300 may then end.

FIG. 4 shows an example timeline 400 for an ELCM test using the method described herein and with regards to FIG. 3 applied to the system described herein and with regards to FIGS. 1 and 2. Timeline 400 includes plot 405 indicating the status of an ELCM pump over time. Timeline 400 also includes plot 410 indicating the position of an ELCM change-over valve over time. Timeline 400 also includes plot 415, indicating the status of a canister vent valve over time, plot 420, indicating the status of a fuel tank isolation valve over time, plot 425, indicating the pressure on the canister side of the fuel system over time, plot 430, indicating the pressure in the fuel tank over time, and plot 435, indicating whether a leak test fail is indicated. Lines 427 and 432 represent a vacuum threshold for a 0.02" leak based on an ELCM reference check. Line 434 represents an expected vacuum bleed-up rate for a 0.01" fuel tank leak.

At time $t_0$, the ELCM pump is off, as shown by plot 405. The ELCM change-over valve (COV) is in the $1^{st}$ position, as shown by plot 410. The CVV and FTIV are closed, as shown by plots 415 and 420, respectively. The CPV may be assumed to be closed throughout timeline 400 (not shown). Canister side pressure is atmospheric, as shown by plot 425, and fuel tank pressure is above atmospheric (positive vapor pressure) as shown by plot 430.

At time $t_1$, entry conditions for the ELCM test are met. Accordingly, the ELCM pump is turned on, as shown by plot 405, while the ELCM COV remains in the $1^{st}$ position, and the CVV and FTIV remain closed, as shown by plots 410, 415, and 420, respectively. In this configuration, the ELCM draws a vacuum through its internal reference orifice, allowing a vacuum reference to be established for a leak with an equivalent diameter to the reference orifice (0.02" in this example). As such, the canister side pressure and fuel tank pressure remain constant, even with the pump on, as shown by plots 425 and 430, respectively.

At time $t_2$, the vacuum reference is set, as denoted by lines 427 and 432. The canister side test may then begin. The ELCM pump remains on, as shown by plot 405, and the ELCM COV is moved to the second position via the energizing of the ELCM solenoid. The CVV is opened, as shown by plot 415, while the FTIV remains closed, as shown by plot 420. While in this conformation, the ELCM pump draws a vacuum on the canister side of the fuel system, but not the fuel tank. From time $t_2$ to time $t_3$, the canister side pressure drops, as shown by plot 425, until the pressure reaches the vacuum reference shown by line 427. With the canister side pressure reaching the vacuum reference at time $t_3$, the integrity of the canister side is confirmed, and the ELCM test may progress to testing the fuel tank.

At time $t_3$, the FTIV is opened, as shown by plot 420, while the ELCM pump remains on, the ELCM COV remains in the $2^{nd}$ position, and the CVV remains open, as shown by plots 405, 410, and 415, respectively. The opening of the FTIV causes fuel vapor to be released into the canister side of the system, where it is adsorbed within the fuel vapor canister. Accordingly, the canister side pressure rises briefly, and then decreases due to the action of the ELCM pump, as shown by plot 425. As shown by plot 430, the fuel tank pressure decreases from $t_3$ to $t_4$, when the fuel tank pressure reaches the vacuum reference shown by line 432. The FTIV is then closed, as shown by plot 420, trapping the vacuum within the fuel tank. This allows the ELCM pump to be turned off, as shown by plot 405. In this example, the CVV is left open until $t_5$, when the canister side pressure reaches atmospheric pressure, as shown by plots 415 and 425, respectively. The ELCM COV may also then to be moved to the $1^{st}$ position, as shown by plot 410.

The fuel tank pressure is monitored from $t_4$ to $t_6$ (vacuum bleed-up). Line 434 represents an expected bleed-up profile for a 0.01" leak given the example conditions. At time $t_6$, it is determined that the actual rate of vacuum bleed-up exceeds the expected rate of vacuum bleed-up by a threshold amount. This condition is indicative of a fuel tank leak, and thus a leak test fail is indicated, as shown by plot 435.

FIG. 5 shows an additional method for using an ELCM with a single reference orifice to determine the presence of leaks of multiple sizes in different sectors of a fuel system. FIG. 5 shows a high-level flow chart for an example method 500 for performing an ELCM test in accordance with the current disclosure. Method 500 will be described with relation to the systems depicted in FIGS. 1 and 2, but it should be understood that similar methods may be used with other systems without departing from the scope of this disclosure. Method 500 may be carried out by controller 12.

Similarly to method 300, method 500 may begin at 505 by estimating operating conditions. Continuing at 510, method 500 may include determining whether entry conditions for an ELCM test are met. If conditions are not met, method 500 may proceed to 512. At 512, method 500 may include aborting the ELCM test and may further include setting a flag to indicate the test should be attempted at a subsequent time point.

If entry conditions are met, method 500 may proceed to 515. At 515, method 500 may include performing a reference check. Performing a reference check may include placing the ELCM COV in the $1^{st}$ position, closing the CVV, and activating the ELCM pump, as shown by FIG. 2A. The vacuum created may be recorded and indicated as a reference check vacuum. In some examples, the ELCM reference orifice may be set at 0.017", but larger or smaller orifices may be used.

Continuing at 520, method 500 may include evacuating the canister side of the fuel system. Evacuating the canister side of the fuel system may include closing (or maintaining closed) the FTIV, opening the CVV, closing (or maintaining closed) the CPV, placing the ELCM COV in the $2^{nd}$ position, and activating (or maintaining active) the ELCM pump. The canister side of the fuel system may be evacuated for a period of time, until the canister side vacuum reaches or exceeds the reference check vacuum, or until the canister side vacuum reaches a plateau. Continuing at 525, method 500 may include setting a canister threshold value (CTV). The CTV may be obtained by, for example, dividing the attained canister side vacuum by the reference check vacuum. The CTV may then be used to determine the leak size (or lack thereof) on the canister side. An acceptable leak size (for example, 0.02") may be programmed in controller 12. Continuing at 530, method 500 may include determining whether a leak greater than or equal to 0.02" has been detected.

If a 0.02" leak has been detected, method 500 may proceed to 532. At 532, method 500 may include indicating a canister side leak, and may further include illuminating a MIL. Method 500 may then end.

If a 0.02" leak is not detected, method 500 may proceed to 535. At 535, method 500 may include opening the FTIV and evacuating the entire fuel system. The CVV may remain open, the CPV may remain closed, and the ELCM COV may remain in the $1^{st}$ position, while the ELCM pump is activated (or maintained active). The fuel system (including both the fuel tank and the canister side) may be evacuated for a period of time, until the fuel system vacuum reaches or exceeds the reference check vacuum, or until the fuel system vacuum reaches a plateau.

Continuing at 540, method 500 may include setting a system threshold value (STV). The STV may be obtained by, for example, dividing the attained system vacuum by the reference vacuum. Continuing at 545, method 500 may include determining whether the CTV and STV are indicative of a 0.01" leak in the fuel tank. This determination may be performed by entering the values for the CTV and STV into an algorithm or lookup table stored on controller 12. By evacuating the canister side first, and then the fuel tank, a 0.01" leak in the fuel tank may be considered an effective 0.01" leak added to any leak on the canister side of the fuel system.

If it is determined that the CTV and STV are indicative of a 0.01" leak in the fuel tank, method 500 may proceed to 550. At 550, method 500 may include indicating a tank side leak, and may further include illuminating a MIL. Method 500 may then end. If the CTV and STV are not indicative of a 0.01" leak, method 500 may proceed to 555. At 555, method 500 may include indicating a passing test. Method 500 may then end.

Vacuum-pump based leak tests, such as the tests described herein have a drawback in that evacuating the fuel tank may lead to the fuel vapor canister becoming saturated with fuel vapors. ELCM's are typically installed in PHEVs, or other vehicles with low engine-run time or low manifold vacuum. As such, there may be limited options for purging stored fuel vapors. Parking a vehicle for a prolonged period of time with a full vapor canister may lead to increased bleed emissions.

FIG. 6 describes an example method 600 for passively purging a fuel vapor canister to the fuel tank following an ELCM based leak test in accordance with the current disclosure. Method 600 utilizes fuel tank vacuum that may accumulate during the leak test to purge the canister. Method 600 will be described with relation to the systems depicted in FIGS. 1 and 2, but it should be understood that similar methods may be used with other systems without departing from the scope of this disclosure. Method 600 may be carried out by controller 12. Method 600 will be described as a standalone method, but similar methods may be executed following an ELCM based leak test, such as the leak tests described herein and with regards to FIGS. 3 and 5.

Similarly to methods 300 and 500, method 600 may begin at 605 by estimating operating conditions. Continuing at 610, method 600 may include determining whether entry conditions for an ELCM test are met. If conditions are not met, method 600 may proceed to 612. At 612, method 600 may include aborting the ELCM test and may further include setting a flag to indicate the test should be attempted at a subsequent time point.

If entry conditions are met, method 600 may proceed to 615. At 615, method 600 may include performing a reference check. Performing a reference check may include placing the ELCM COV in the $1^{st}$ position, closing the CVV, and activating the ELCM pump, as shown by FIG. 2A. The vacuum created may be recorded and indicated as a reference check vacuum.

Continuing at 620, method 600 may include opening the FTIV, opening the CVV, and subsequently evacuating the fuel tank. As described herein, in some examples, the ELCM test may evacuate the canister side of the fuel system while maintaining the FTIV closed prior to evacuating the fuel tank. Evacuating the fuel tank may include placing the ELCM COV in the $2^{nd}$ position, and activating the ELCM pump, as shown in FIG. 2B. The fuel tank (or fuel system, including both the fuel tank and the canister side) may be evacuated for a period of time, until the fuel tank vacuum reaches or exceeds the reference check vacuum, or until the fuel tank vacuum reaches a plateau.

Continuing at 630, method 600 may include determining whether a leak is detected. Determining whether a leak is detected may include comparing the attained fuel tank vacuum to the reference vacuum. If a leak is detected, method 600 may proceed to 632. At 632, method 600 may include indicating a leak, and may further include illuminating a MIL. Method 600 may then end. If no leak is detected, method 600 may proceed to 635. At 635, method 600 may include indicating a passing leak test.

Continuing at 640, method 600 may include determining whether the fuel tank vacuum is greater than a purge threshold. In other words, method 600 may include determining whether there is sufficient vacuum in the fuel tank to purge the fuel vapor canister. The vacuum threshold may be predetermined, or may be based on current conditions, such as fuel tank fill level, barometric pressure, canister load, etc. If the fuel tank vacuum is less than the vacuum threshold, method 600 may proceed to 642. At 642, method 600 may include turning off the ELCM pump, closing the FTIV, and closing the CVV, and may further include returning the ELCM COV to the $1^{st}$ position. Method 600 may then end.

If there is sufficient fuel tank vacuum to perform a passive purge operation, method 600 may proceed to 645. At 645, method 600 may include turning off the ELCM pump while maintaining the FTIV open, the CVV closed, and the CVV open, and may further include maintaining the COV in the $2^{nd}$ position. Continuing at 650, method 600 may include purging stored fuel vapor from the fuel vapor canister to the fuel tank. At 655, method 600 may include closing the FTIV responsive to the fuel tank pressure increasing to atmospheric pressure. Fuel tank pressure may be determined via a fuel tank pressure sensor. Continuing at 660, method 600 may include placing the ELCM COV in the $1^{st}$ position and closing the CVV. Method 600 may then end.

FIG. 7 shows an example timeline 700 for an ELCM test and passive purge using the method described herein and with regards to FIG. 6 applied to the system described herein and with regards to FIGS. 1 and 2. Timeline 700 includes plot 705 indicating the status of an ELCM pump over time. Timeline 700 also includes plot 710 indicating the position of an ELCM change-over valve over time. Timeline 700 also includes plot 715, indicating the status of a fuel tank isolation valve over time, plot 720, indicating the status of a canister vent valve over time, plot 730, indicating the pressure in a fuel tank over time, and plot 735, indicating a fuel vapor canister load over time. Line 732 represents a reference vacuum level based on an ELCM reference check.

At time $t_0$, the ELCM pump is off, as shown by plot 705. The ELCM change-over valve (COV) is in the $1^{st}$ position, as shown by plot 710. The FTIV and CVV are closed, as shown by plots 715 and 720, respectively. The CPV may be assumed to be closed throughout timeline 700 (not shown). Fuel tank pressure is above atmospheric (positive vapor pressure) as shown by plot 730. The vapor canister load is at or near empty, as shown by plot 735.

At time $t_1$, entry conditions for the ELCM test are met. Accordingly, the ELCM pump is turned on, as shown by plot 705, while the ELCM COV remains in the $1^{st}$ position, and the FTIV and CVV remain closed, as shown by plots 710, 715, and 720, respectively. In this configuration, the ELCM draws a vacuum through its internal reference orifice, allowing a vacuum reference to be established for a leak with an equivalent diameter to the reference orifice (0.02" in this example). As such, the fuel tank pressure remains constant, even with the pump on, as shown by plot 730.

At time $t_2$, the vacuum reference is set, as denoted by line 732. The leak test may then begin. The ELCM pump remains on, as shown by plot 705, and the ELCM COV is moved to the second position via the energizing of the ELCM solenoid, as shown by plot 710. The FTIV and CVV are opened, as shown by plots 715 and 720, respectively. While in this conformation, the ELCM pump draws a vacuum on the entire fuel system, including the fuel tank.

From $t_2$ to $t_3$, the ELCM pump draws a vacuum on the fuel tank, causing the fuel tank pressure to drop, as shown by plot 730. As fuel vapor is drawn out of the fuel tank, it is adsorbed by the fuel vapor canister, as shown by plot 735. At time $t_3$, the fuel tank pressure reaches the reference vacuum denoted by line 732, signifying the integrity of the fuel system. A passing test may be indicated, as described with regards to FIG. 6. The ELCM pump is then shut off, while maintaining the ELCM COV in the $2^{nd}$ position, and maintaining the FTIV and CVV open. This configuration causes the vacuum accumulated in the fuel tank to draw fresh air into the fuel system via the open CVV, causing the fuel tank pressure to rise, as shown by plot 730. The fresh air also causes fuel vapor to desorb from the canister to the fuel tank, as indicated by the decreasing canister load shown in plot 735.

At time $t_4$, the fuel tank pressure equilibrates to atmospheric pressure, as shown by plot 730. Net airflow into and out of the fuel system is thus zero. The ELCM COV is returned to the first position, as shown by plot 710. The FTIV and CVV are closed, as shown by plots 715 and 720, respectively.

The systems described herein and depicted in FIGS. 1 and 2, as well as the methods described herein and depicted in FIGS. 5 and 6 may enable one or more methods and one or more systems. In one example, a method, comprising: indicating leakage on a canister side of a fuel system based on a first fuel system pressure following applying a vacuum to the fuel system with a fuel tank isolation valve closed; and indicating leakage on a fuel tank side of the fuel system based on the first fuel system pressure and a second fuel system pressure following applying a vacuum to the fuel system with the fuel tank isolation valve open. Indicating leakage on the canister side of the fuel system may further comprise: determining a reference pressure by applying a vacuum to a reference orifice; and dividing the first fuel system pressure by the reference pressure to establish a canister side threshold value. The method may further comprise: determining a size of a leak on the canister side of the fuel system based on a diameter of the reference orifice and the canister side threshold value. In some examples, indicating leakage on the fuel tank side of the fuel system may further comprise: dividing the second fuel system pressure by the reference pressure to establish a system threshold value; and determining a size of a leak on the fuel tank side of the fuel system based on the system threshold value and the canister side threshold value. The method may further comprise: purging stored fuel vapors from a fuel vapor canister to a fuel tank by maintaining the fuel tank isolation valve open following cessation of applying a vacuum to the fuel system with the fuel tank isolation valve open. In some embodiments, the method may further comprise: closing the fuel tank isolation valve responsive to a fuel tank pressure increasing to atmospheric pressure. The technical result of implementing this method is that an ELCM with a single reference orifice may be used to perform a leak test with two different thresholds for leak detection. This may allow vehicles currently in production to meet future emissions standards without costly upgrades to the ELCM.

In another example, a method for an evaporative emissions system leak test, comprising: determining a reference vacuum threshold; determining a first fuel system pressure by drawing a vacuum on a fuel system with a fuel tank isolation valve closed; generating a canister threshold value based on the first fuel system pressure and the reference vacuum threshold; indicating a leak based on the canister threshold value; determining a second fuel system pressure by drawing a vacuum on the fuel system with the fuel tank isolation valve open; generating a fuel system threshold value based on the second fuel system pressure and the reference vacuum threshold; and indicating a leak based on the fuel system threshold value and the canister threshold value. Determining the reference vacuum threshold may further comprise: isolating an evaporative leak check module from a fuel tank; activating a vacuum pump comprising the evaporative leak check module; drawing a vacuum across a reference orifice; and determining a reference vacuum in the evaporative leak check module. In some embodiments, determining a first fuel system pressure may further comprise: opening a canister vent valve; and coupling the vacuum pump to both atmosphere and the fuel system. Coupling the vacuum pump to both atmosphere and the fuel system may further comprise: moving a changeover valve within the evaporative leak check module from a first position to a second position. In some embodiments, the method may further comprise: responsive to the second fuel system pressure being less than a purge vacuum threshold, maintaining the fuel tank isolation valve open; maintaining the canister vent valve open; maintaining the changeover valve in the second position; deactivating the vacuum pump; and purging stored fuel vapor from a fuel vapor canister to the fuel tank. The method may further comprise: responsive to a fuel tank pressure increasing to atmospheric pressure, closing the fuel tank isolation valve; shifting the changeover valve to the first position; and closing the canister vent valve. The technical result of implementing this method is that a vehicle may utilize an ELCM to detect leaks in a fuel tank that are smaller than the reference orifice within the ELCM. This may allow ELCMs currently in production to be utilized to meet future emissions standards without increasing the production costs by adding additional orifices and associated valves and conduits.

In yet another example, a fuel system for a vehicle, comprising: a fuel tank; a fuel vapor canister coupled to the fuel tank via a fuel tank isolation valve; an evaporative leak check module coupled to the fuel vapor canister via a canister vent valve; and a control system including executable instructions stored in non-transitory memory for: determining a reference vacuum threshold; determining a first fuel system pressure by drawing a vacuum on the fuel system with the fuel tank isolation valve closed; generating a canister threshold value based on the first fuel system pressure and the reference vacuum threshold; indicating a leak based on the canister threshold value; determining a second fuel system pressure by drawing a vacuum on the fuel system with the fuel tank isolation valve open; generating a fuel system threshold value based on the second fuel system pressure and the reference vacuum threshold; and indicating a leak based on the fuel system threshold value and the canister threshold value. The evaporative leak check module may comprise: a vacuum pump; a changeover valve movable between a first position and a second position; a reference orifice; a pressure sensor; and determining a reference vacuum threshold may further comprise: closing the canister vent valve; placing the changeover valve in the first position; activating the vacuum pump; drawing a vacuum across the reference orifice; and measuring an internal pressure in the evaporative leak check module. Determining a first fuel system pressure may further comprise: opening the canister vent valve; placing the changeover valve in the second position; then activating the vacuum pump. Determining a second fuel system pressure may further comprise: maintaining the canister vent valve open; and maintaining the changeover valve in the second position. In some examples, the control system may further include executable instructions stored in non-transitory memory for: responsive to the second fuel system pressure being less than a purge vacuum threshold, maintaining the fuel tank isolation valve open; maintaining the canister vent valve open; maintaining the changeover valve in the second position; deactivating the vacuum pump; and purging stored fuel vapor from a fuel vapor canister to the fuel tank. The control system may further include executable instructions stored in non-transitory memory for: responsive to a fuel tank pressure increasing to atmospheric pressure, closing the fuel tank isolation valve; shifting the changeover valve to the first position; and closing the canister vent valve. In some embodiments, the control system may further include executable instructions stored in non-transitory memory for: indicating a leak with a diameter less than the diameter of the reference orifice based on the fuel system threshold value and the canister threshold value. The reference orifice may comprise a diameter of 0.017". The technical result of implementing this system is a passive purging of a fuel vapor canister following an evaporative emissions leak test. This allows fuel vapors drawn to the canister during the application of a vacuum to the fuel tank to be desorbed back to the fuel tank. This may decrease bleed emissions in a passive manner, without drawing power on the vehicle battery, and without forcing the vehicle engine on to perform a purge routine.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
  indicating a reference pressure following applying a vacuum to a reference orifice;
  indicating leakage on a canister side of a fuel system based on a first fuel system pressure following applying a vacuum to the fuel system with a fuel tank isolation valve closed;
  indicating leakage on a fuel tank side of the fuel system based on the first fuel system pressure and a second fuel system pressure following applying a vacuum to the fuel system with the fuel tank isolation valve open;
  responsive to attaining the reference pressure following applying the vacuum to the fuel system with the fuel tank isolation valve open, closing the fuel tank isolation valve to trap a vacuum within a fuel tank;
  monitoring vacuum bleed-up within the fuel tank over time; and
  indicating leakage on the fuel tank side of the fuel system based on a comparison of a rate of vacuum bleed-up with an expected rate of vacuum bleed-up for a leak with a diameter less than a diameter of the reference orifice.

2. The method of claim 1, where indicating leakage on the canister side of the fuel system further comprises:
  dividing the first fuel system pressure by the reference pressure to establish a canister side threshold value.

3. The method of claim 2, further comprising:
  determining a size of a leak on the canister side of the fuel system based on the diameter of the reference orifice and the canister side threshold value.

4. The method of claim 2, where indicating leakage on the fuel tank side of the fuel system further comprises:
  dividing the second fuel system pressure by the reference pressure to establish a system threshold value; and
  determining a size of a leak on the fuel tank side of the fuel system based on the system threshold value and the canister side threshold value.

5. The method of claim 1, further comprising:
  purging stored fuel vapors from a fuel vapor canister to the fuel tank by maintaining the fuel tank isolation valve open following cessation of applying the vacuum to the fuel system with the fuel tank isolation valve open.

6. The method of claim 5, further comprising:
  closing the fuel tank isolation valve responsive to a fuel tank pressure increasing to atmospheric pressure.

7. A method for an evaporative emissions system leak test, comprising:
  determining a reference vacuum threshold;
  determining a first fuel system pressure by drawing a vacuum on a fuel system with a fuel tank isolation valve closed;
  generating a canister threshold value based on the first fuel system pressure and the reference vacuum threshold;
  indicating a leak based on the canister threshold value;
  determining a second fuel system pressure by drawing a vacuum on the fuel system with the fuel tank isolation valve open;
  generating a fuel system threshold value based on the second fuel system pressure and the reference vacuum threshold; and indicating a leak within a fuel tank based on both the fuel system threshold value and the canister threshold value.

8. The method of claim 7, where determining the reference vacuum threshold further comprises:
isolating an evaporative leak check module from the fuel tank;
activating a vacuum pump comprising the evaporative leak check module;
drawing a vacuum across a reference orifice; and
determining a reference vacuum in the evaporative leak check module.

9. The method of claim 8, where determining the first fuel system pressure further comprises:
coupling the vacuum pump to both atmosphere and the fuel system.

10. The method of claim 9, where coupling the vacuum pump to both atmosphere and the fuel system further comprises:
moving a changeover valve within the evaporative leak check module from a first position to a second position.

11. The method of claim 10, further comprising:
responsive to the second fuel system pressure being less than a purge vacuum threshold, maintaining the fuel tank isolation valve open;
maintaining the changeover valve in the second position;
deactivating the vacuum pump; and
purging stored fuel vapor from a fuel vapor canister to the fuel tank.

12. The method of claim 11, further comprising:
responsive to a fuel tank pressure increasing to atmospheric pressure, closing the fuel tank isolation valve; and
shifting the changeover valve to the first position.

13. The method of claim 8, wherein indicating the leak within the fuel tank based on the fuel system threshold value and the canister threshold value further comprises:
indicating a leak within the fuel tank with a diameter less than a diameter of the reference orifice.

14. A fuel system for a vehicle, comprising:
a fuel tank;
a fuel vapor canister coupled to the fuel tank via a fuel tank isolation valve;
an evaporative leak check module coupled to the fuel vapor canister via a canister and comprising a vacuum pump and a reference orifice; and
a control system including executable instructions stored in non-transitory memory for:
determining a reference vacuum threshold by drawing a vacuum across the reference orifice;
determining a first fuel system pressure by drawing a vacuum on the fuel system with the fuel tank isolation valve closed;
generating a canister threshold value based on the first fuel system pressure and the reference vacuum threshold;
indicating a leak based on the canister threshold value;
determining a second fuel system pressure by drawing a vacuum on the fuel system with the fuel tank isolation valve open;
generating a fuel system threshold value based on the second fuel system pressure and the reference vacuum threshold; and
indicating a leak with a diameter less than a diameter of the reference orifice based on the fuel system threshold value and the canister threshold value.

15. The fuel system of claim 14, where the evaporative leak check module further comprises:
a changeover valve movable between a first position and a second position;
a pressure sensor; and
where determining the reference vacuum threshold further comprises:
closing a canister vent valve;
placing the changeover valve in the first position;
activating the vacuum pump; and
measuring an internal pressure in the evaporative leak check module.

16. The fuel system of claim 15, where determining the first fuel system pressure further comprises:
placing the changeover valve in the second position; then activating the vacuum pump.

17. The fuel system of claim 16, where determining the second fuel system pressure further comprises:
maintaining the changeover valve in the second position.

18. The fuel system of claim 15, where the control system further includes executable instructions stored in non-transitory memory for:
responsive to the second fuel system pressure being less than a purge vacuum threshold, maintaining the fuel tank isolation valve open;
maintaining the changeover valve in the second position;
deactivating the vacuum pump; and
purging stored fuel vapor from the fuel vapor canister to the fuel tank.

19. The fuel system of claim 18, where the control system further includes executable instructions stored in non-transitory memory for:
responsive to a fuel tank pressure increasing to atmospheric pressure, closing the fuel tank isolation valve; and
shifting the changeover valve to the first position.

20. The fuel system of claim 14, where the reference orifice comprises a diameter of 0.017".

* * * * *